(12) United States Patent
Levit-Gurevich et al.

(10) Patent No.: US 10,867,362 B2
(45) Date of Patent: Dec. 15, 2020

(54) METHODS AND APPARATUS TO IMPROVE OPERATION OF A GRAPHICS PROCESSING UNIT

(71) Applicant: Intel Corporation, Santa Clara, CA (US)

(72) Inventors: Konstantin Levit-Gurevich, Kiryat Byalik (IL); Michael Berezalsky, Tirat Carmel (IL); Noam Itzhaki, Yokneam Elit (IL); Arik Narkis, Kiryat Tivon (IL); Orr Goldman, Harel (IL)

(73) Assignee: INTEL CORPORATION, Santa Clara, CA (US)

( * ) Notice: Subject to any disclaimer, the term of this patent is extended or adjusted under 35 U.S.C. 154(b) by 8 days.

(21) Appl. No.: 16/129,525

(22) Filed: Sep. 12, 2018

(65) Prior Publication Data

US 2019/0043158 A1    Feb. 7, 2019

(51) Int. Cl.
*G06T 1/20* (2006.01)
*G06F 9/50* (2006.01)
*G06T 1/60* (2006.01)
*G06F 11/34* (2006.01)

(52) U.S. Cl.
CPC .............. *G06T 1/20* (2013.01); *G06F 9/5011* (2013.01); *G06F 9/5083* (2013.01); *G06F 11/34* (2013.01); *G06T 1/60* (2013.01)

(58) Field of Classification Search
CPC . G06T 1/20; G06T 1/60; G06F 9/5083; G06F 11/34; G06F 9/5011; G06F 11/302; G06F 2201/865; G06F 2201/81; G06F 11/3433; G06F 11/3466; G06F 11/3423

USPC ......................................................... 345/522
See application file for complete search history.

(56) References Cited

U.S. PATENT DOCUMENTS

| 6,769,054 | B1 * | 7/2004 | Sahin | G06F 11/3466 |
| | | | | 711/162 |
| 2003/0135609 | A1 * | 7/2003 | Carlson | G06F 9/5011 |
| | | | | 709/224 |
| 2017/0329618 | A1 * | 11/2017 | Tsirkin | G06F 12/1009 |
| 2018/0046520 | A1 * | 2/2018 | Baughman | G06F 9/5088 |
| 2019/0102180 | A1 * | 4/2019 | Hari | G06F 9/30029 |

OTHER PUBLICATIONS

Nvidia, "Scrubber," Nvidia Nsight Graphics 1.0 User Guide, Mar. 19, 2018, 6 pages.

(Continued)

*Primary Examiner* — Ke Xiao
*Assistant Examiner* — Kim Thanh T Tran
(74) *Attorney, Agent, or Firm* — Hanley, Flight & Zimmerman, LLC (57) ABSTRACT

Methods, apparatus, systems, and articles of manufacture are disclosed to improve operation of a graphics processing unit (GPU). An example apparatus includes an instruction generator to insert profiling instructions into a GPU kernel to generate an instrumented GPU kernel, the instrumented GPU kernel is to be executed by a GPU, a trace analyzer to generate an occupancy map associated with the GPU executing the instrumented GPU kernel, a parameter calculator to determine one or more operating parameters of the GPU based on the occupancy map, and a processor optimizer to invoke a GPU driver to adjust a workload of the GPU based on the one or more operating parameters.

27 Claims, 7 Drawing Sheets

(56) References Cited

OTHER PUBLICATIONS

Nvidia, "Performance Markers," Nvidia Developer Zone, Mar. 19, 2018, 2 pages.
Nvidia, "Nvidia Nsight Graphics 1.0 User Guide," Nvidia Developer Zone, Mar. 19, 2018, 132 pages.
Nvidia, "Nvidia Nsight Graphics 1.1 User Guide," Nvidia Developer Zone, Apr. 26, 2018, 121 pages.
Nvidia, "Nvidia Nsight Graphics 1.2 User Guide," Nvidia Developer Zone, May 31, 2018, 134 pages.

* cited by examiner

METHODS AND APPARATUS TO IMPROVE OPERATION OF A GRAPHICS PROCESSING UNIT

FIELD OF THE DISCLOSURE

This disclosure relates generally to computers and, more particularly, to methods and apparatus to improve operation of a graphics processing unit (GPU).

BACKGROUND

Software developers seek to develop code that may be executed as efficiently as possible. To better understand code execution, profiling is used to measure different code execution statistics such as, for example, execution time, memory consumption, etc. In some examples, profiling is implemented by insertion of profiling instructions into the code. Such profiling instructions can be used to store and analyze information about the code execution.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

A graphics processing unit (GPU) is an electronic circuit that executes instructions to modify contents of a buffer. Typically, the buffer is a frame buffer that is used to output information to a display device (e.g., a monitor, a touchscreen, etc.). Recently, GPUs have been used for tasks that are not necessarily related to generating output images.

GPUs execute instruction packages commonly referred to as kernels, compute kernels, and/or shaders. Typically, the term shader is used when a kernel is used for graphics-related tasks such as, for example, DirectX, Open Graphics Library (OpenGL) tasks, pixel shader/shading tasks, vertex shader/shading tasks, etc. The term kernel is used for general purpose computational tasks such as, for example, Open Computing Language (OpenCL) tasks, C for Media tasks, etc. While example approaches disclosed herein use the term kernel, such approaches are equally well suited to be used on shaders. Such kernels roughly correspond to an inner loop of a program that is iterated multiple times. As used herein, a GPU kernel refers to a kernel in binary format. A GPU programmer develops kernels/shaders in a high-level programming language such as, for example, a High-Level Shader Language (HLSL), OpenCL, etc., and then compiles the code into a binary version of the kernel which is then executed by a GPU. Example approaches disclosed herein are applied to the binary version of the kernel.

Developers want to create the most computationally efficient kernels to perform their desired task. To gain a better understanding of the performance of a kernel, developers use a profiler and/or profiling system to collect operational statistics (e.g., performance statistics) of the kernel. Profilers insert additional instructions into the kernel to collect such operational statistics. However, prior profilers and/or profiling systems are used to determine occupancy of a central processing unit (CPU). Prior profilers and/or profiling systems determine the occupancy of the CPU because an operating system running on the CPU provides visibility of the CPU utilization for each of the cores and threads of the CPU. However, GPUs do not have an operating system running on the GPUs and, therefore, do not have an ability to measure busy and idle time intervals at the granularity of the execution units and hardware threads of the GPUs.

Examples disclosed herein improve operation of a GPU by measuring operating parameters of the GPU and determining whether to adjust operation of the GPU based on the measured operating parameters. In some disclosed examples, one or more processors included in a central processing unit (CPU) determines one or more operating parameters (e.g., operational statistics, performance statistics, etc.) associated with the GPU including at least one of a busy time parameter, an idle time parameter, an occupancy time parameter, or a utilization parameter. As used herein, a busy time of the GPU refers to a time interval, a time duration, etc., when a hardware thread of the GPU is busy executing a computational task. As used herein, an idle time of the GPU refers to a time interval, a time duration, etc., when a hardware thread of the GPU is not executing a computational task. As used herein, an occupancy of the GPU refers to a set of busy and/or idle time intervals associated with an execution unit and/or hardware thread of the GPU during execution of one or more computational tasks. As used herein, utilization of the GPU refers to a ratio of the busy time and a total time associated with the execution of the one or more computational tasks.

In some disclosed examples, the CPU inserts additional instructions into kernels to collect information corresponding to the one or more operating parameters associated with the kernels. Additional instructions may include profiling instructions to instruct the GPU to record and/or otherwise store timestamps associated with a start time, an end time, etc., of an execution of the kernel. For example, when the GPU executes a kernel that includes the additional instructions, the GPU may store a start time associated with starting an execution of the kernel and an end time associated with ending the execution of the kernel. The GPU may store the timestamps and a corresponding hardware thread identifier in a trace buffer in memory. In such examples, the CPU may obtain the trace buffer and determine the one or more operating parameters based on information included in the trace buffer. In some disclosed examples, the CPU can determine that the GPU can execute additional computational tasks, fewer additional tasks, etc., based on the one or more operating parameters and, thus, improve operation of the GPU, scheduling operations of the CPU, etc.

Figure 1:
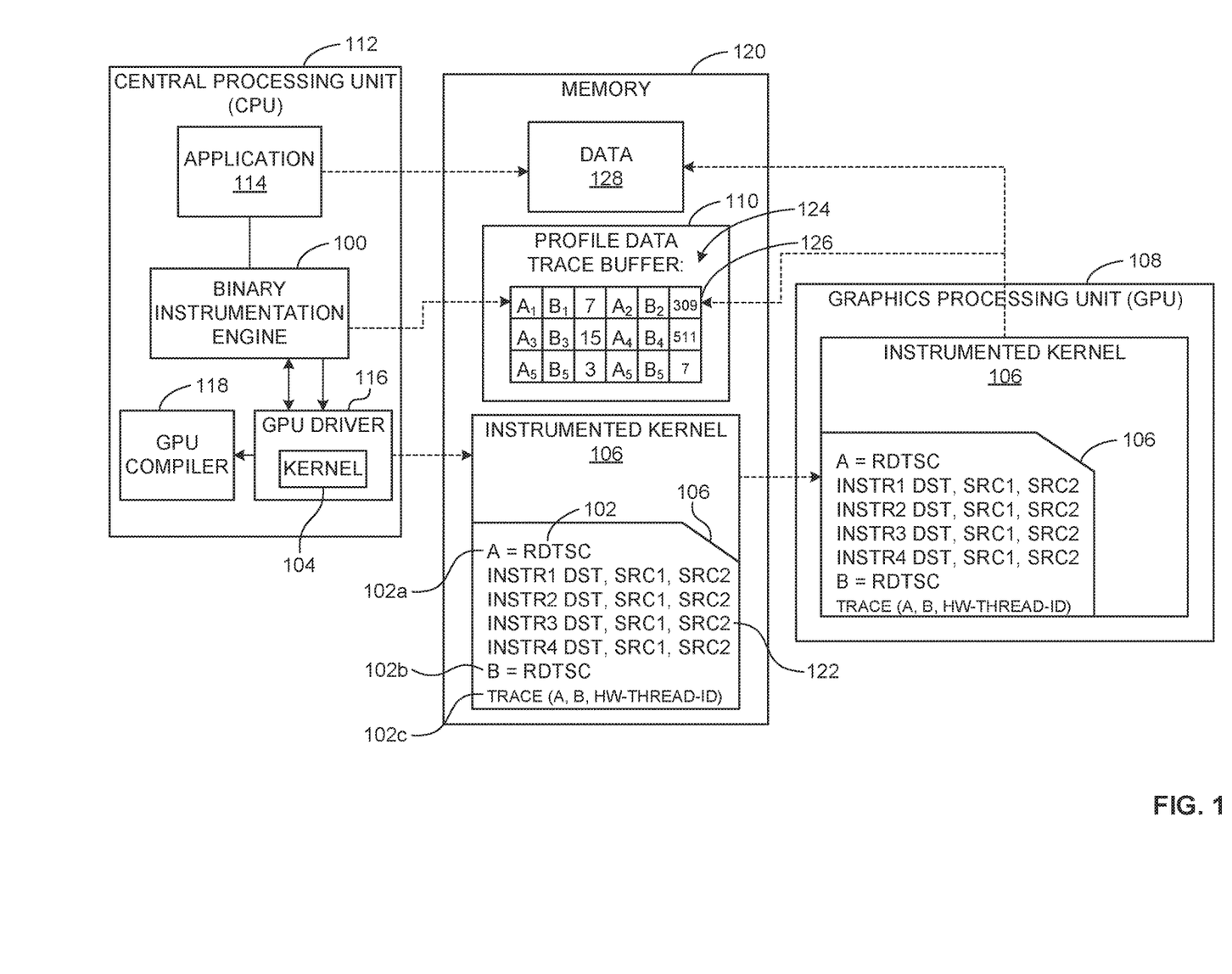
FIG. 1 is a block diagram illustrating an example binary instrumentation engine inserting profiling instructions into a GPU kernel in accordance with teachings of this disclosure.

FIG. 1 is a block diagram illustrating an example binary instrumentation engine 100 inserting example profiling instructions 102 into a first example GPU kernel 104 to generate a second example GPU kernel 106 to be executed by an example GPU 108. The second GPU kernel 106 is an instrumented GPU kernel. The GPU 108 may use the profiling instructions 102 to generate example profile data 110. The profile data 110 corresponds to data generated by the GPU 108 in response to executing the profiling instructions 102 included in the second kernel 106. The binary instrumentation engine 100 may obtain and analyze the profile data 110 to better understand the execution of the second kernel 106 by the GPU 108. The binary instrumentation engine 100 may determine to adjust operation of the GPU 108 based on analyzing the profile data 110.

In some examples, the profiling instructions 102 create and/or store operational information such as, for example, counters, timestamps, etc., that can be used to better understand the execution of a kernel. For example, the profiling instructions 102 may profile and/or otherwise characterize an execution of the second kernel 106 by the GPU 108. In some examples, the profiling instructions 102 are inserted at a first address (e.g., a first position) of a kernel (e.g., the beginning of the first kernel 104) to initialize variables used for profiling. In some examples, the profiling instructions 102 are inserted at locations intermediate the original instructions (e.g., intermediate the instructions from the first kernel 104). In some examples, the profiling instructions 102 are inserted at a second address (e.g., a second position) of the kernel (e.g., after the instructions from the first kernel 104) and, when executed, cause the GPU 108 to collect and/or otherwise store the metrics that is accessible by the binary instrumentation engine 100. In some examples, the profiling instructions 102 are inserted at the end of the kernel (e.g., the first kernel 104) to perform cleanup (e.g., freeing memory locations, etc.). However, such profiling instructions 102 may additionally or alternatively be inserted at any location or position and in any order.

In the illustrated example of FIG. 1, an example CPU 112 includes the binary instrumentation engine 100, an example application 114, an example GPU driver 116, and an example GPU compiler 118. The application 114 may be used to display an output from the GPU 108 when the GPU 108 executes graphics-related tasks such as, for example, DirectX tasks, OpenGL tasks, pixel shader/shading tasks, vertex shader/shading tasks, etc. Additionally or alternatively, the application 114 may be used to display and/or otherwise process outputs from the GPU 108 when the GPU 108 executes non-graphics related tasks. Additionally or alternatively, the application 114 may be used by a GPU programmer to facilitate development of kernels/shaders in a high-level programming language such as, for example, HLSL, OpenCL, etc.

In FIG. 1, the application 114 transmits tasks (e.g., computational tasks, graphics-related tasks, non-graphics related tasks, etc.) to the GPU driver 116. The GPU driver 116 receives the tasks and instructs the GPU compiler 118 to compile code associated with the tasks into a binary version (e.g., a binary format corresponding to binary code, binary instructions, machine readable instructions, etc.) to generate the first kernel 104. The GPU compiler 118 transmits the compiled binary version of the first kernel 104 to the GPU driver 116.

The binary instrumentation engine 100 of FIG. 1 obtains the first kernel 104 (e.g., in a binary format) from the GPU driver 116. The binary instrumentation engine 100 instruments the first kernel 104 by inserting additional instructions such as the profiling instructions 102 into the first kernel 104. As used herein, an instrumented kernel refers to a kernel that includes profiling and/or tracing instructions to be executed to measure statistics or monitor an execution of the kernel. For example, the binary instrumentation engine 100 may modify the first kernel 104 to create an instrumented GPU kernel such as the second kernel 106. That is, the binary instrumentation engine 100 creates the second kernel 106 without executing any compilation of the GPU kernel. In this manner, already-compiled GPU kernels can be instrumented and/or profiled. The second kernel 106 is passed to the GPU 108 via example memory 120. For example, the binary instrumentation engine 100 may transmit the second kernel 106 to the GPU driver 116, which, in turn, stores the second kernel 106 in the memory 120 for retrieval by the GPU 108.

The GPU 108 uses the profiling instructions 102 of FIG. 1 to generate the profile data 110. In FIG. 1, the profiling instructions 102 include a first example instruction 102a of "A=RDTSC" inserted at a first position, where the first instruction 102a corresponds to a read (RD) operation of a register (e.g., a hardware register) associated with a timestamp counter (TSC) and a store operation of a first value of the register in a variable A. The profiling instructions 102 include a second example instruction 102b of "B=RDTSC" inserted at a second position, where the second instruction 102b corresponds to reading the register associated with the TSC and storing a second value of the register in a variable B. The profiling instructions 102 include a third example instruction 102c of "Trace (A, B, HW-thread-ID)" at a third position, where the third instruction 102c corresponds to generating a trace and storing the variables A, B, and an identifier (ID) of a hardware (HW) thread (HW-THREAD-ID) in the trace. For example, the trace may refer to a sequence of data records that are written (e.g., dynamically written) into a memory buffer (referred to herein as a trace buffer).

In FIG. 1, the HW-THREAD-ID corresponds to a hardware thread that executed the second kernel 106 including example GPU instructions 122 disposed between the first instruction 102a and the second instruction 102b. In response to executing the profiling instructions 102 and the GPU instructions 122, the GPU 108 stores the trace that includes information included in the variables A, B, and HW-THREAD-ID in an example trace buffer 124 included in the profile data 110. The trace buffer 124 includes example records 126. For example, a first one of the records 126 in FIG. 1 is [$A_1$, $B_1$, 7], where $A_1$ corresponds to a first timestamp, $B_1$ corresponds to a second timestamp, and 7 corresponds to a hardware thread identifier, where the second timestamp is after the first timestamp. The first timestamp ($A_1$) of the first one of the records 126 may correspond to when a hardware thread with a hardware thread identifier of 7 begins executing the instrumented GPU kernel 106. The second timestamp ($B_1$) of the first one of the records 126 may correspond to when the hardware thread with the hardware thread identifier of 7 concludes executing the instrumented GPU kernel 106.

In the illustrated example of FIG. 1, the memory 120 includes one or more kernels such as the second kernel 106, the profile data 110, and example GPU data 128. Alternatively, the memory 120 may not store one or more kernels. The data 128 corresponds to data generated by the GPU 108 in response to executing at least the second kernel 106. For example, the data 128 may correspond to graphics-related data, output information to a display device, etc.

Figure 2:
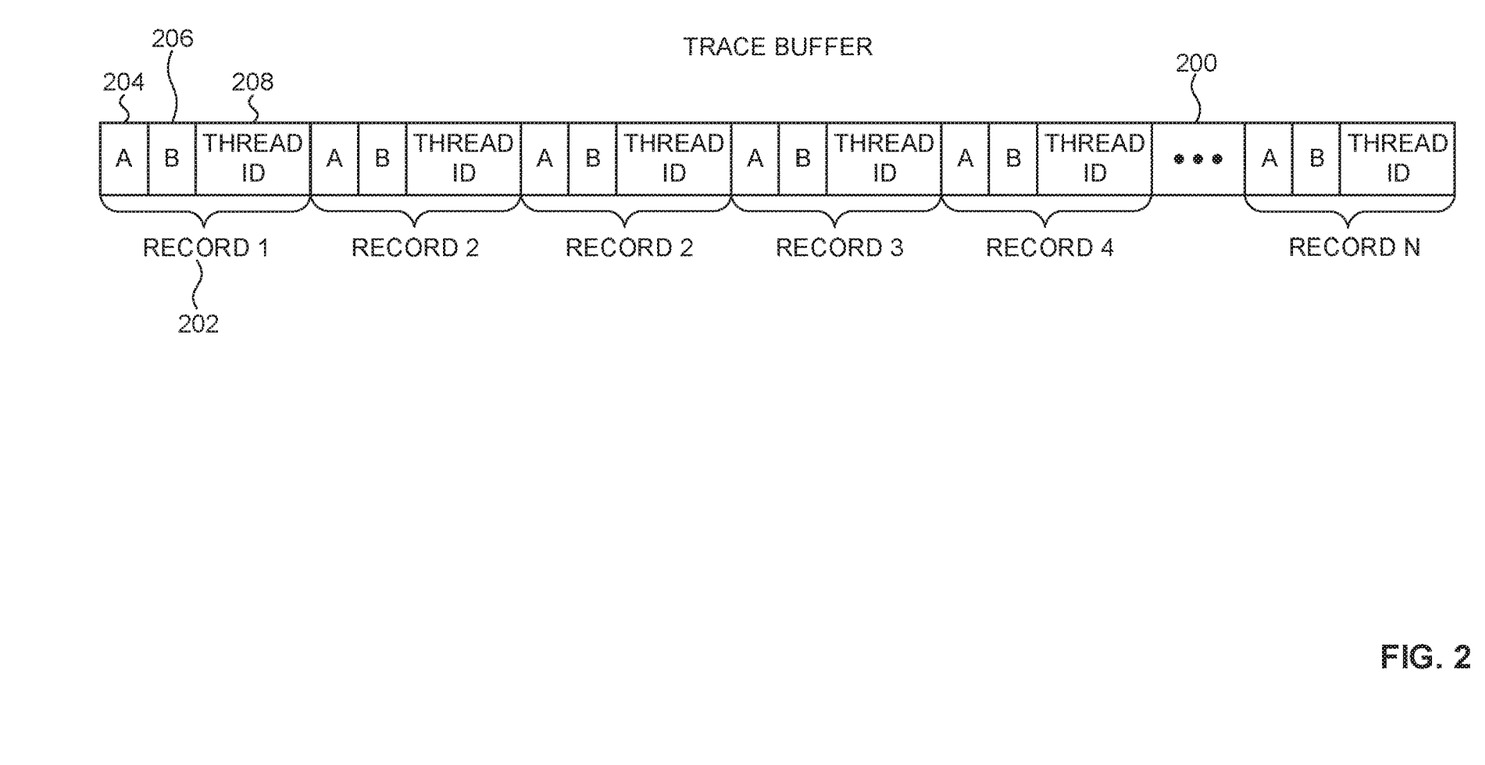
FIG. 2 depicts an example trace buffer generated in accordance with teachings of this disclosure.

The profile data 110 includes the trace buffer 124, which is an example implementation of an example trace buffer 200 depicted in the illustrated example of FIG. 2. The trace buffer 200 of FIG. 2 represents an example format that may be used by the GPU 108 to generate the trace buffer 124 of FIG. 1. In FIG. 2, the trace buffer 200 is a buffer that includes a plurality of example records 202. In FIG. 2, the records 202 may correspond to the records 126 of FIG. 1. For example, a first one of the records 202 of FIG. 2 may correspond to the first one of the records 126 of FIG. 1. Each of the records 202 includes example data fields (e.g., data entries) 204, 206, 208 including a first example data field 204, a second example data field 206, and a third example data field 208. Alternatively, one or more of the records 202 may include fewer or more data fields than depicted in FIG. 2. In FIG. 2, the first data field 204 is a first data storage unit that stores a first value of a timestamp counter (A) associated with a hardware thread executing the second kernel 106. The second data field 206 is a second data storage unit that stores a second value of the timestamp counter (B), where the second value is greater than the first value. For example, the first value may correspond to a first time and the second value may correspond to a second time, where the second time is after or later than the first time. In FIG. 2, the third data field 208 is a third data storage unit that stores an identifier of the hardware thread (THREAD ID).

In the illustrated example of FIG. 2, the trace buffer 200 is generated in an atomic manner. For example, the GPU 108 may generate the trace buffer 200 sequentially where a first one of the records 202 is adjacent to a second one of the records 202, where the first one of the records 202 is generated prior to the second one of the records 202. The GPU 108 generates the records 202 from different hardware threads that are intermixed in the trace buffer 200. For example, the trace buffer 200 may not be stored in chronological order, in order of hardware thread identifier, etc. For example, two records k and m having the same hardware thread identifier have the following characteristics: if k<m, then Ak<Bk<Am<Bm.

Turning back to FIG. 1, the binary instrumentation engine 100 retrieves (e.g., iteratively retrieves, periodically retrieves, etc.) the trace buffer 124 from the memory 120. In some examples, the binary instrumentation engine 100 determines one or more operating parameters associated with the second kernel 106, and/or, more generally, the GPU 108. For example, the binary instrumentation engine 100 may determine a busy time parameter, an idle time parameter, an occupancy time parameter, and/or a utilization parameter. In some examples, the binary instrumentation engine 100 adjusts operation of the GPU 108 based on the one or more operating parameters. For example, the binary instrumentation engine 100 may instruct the CPU 112 to schedule an increased quantity of instructions to be performed by the GPU 108, a decreased quantity of instructions to be performed by the GPU 108, etc., based on the one or more operating parameters.

Figure 3:
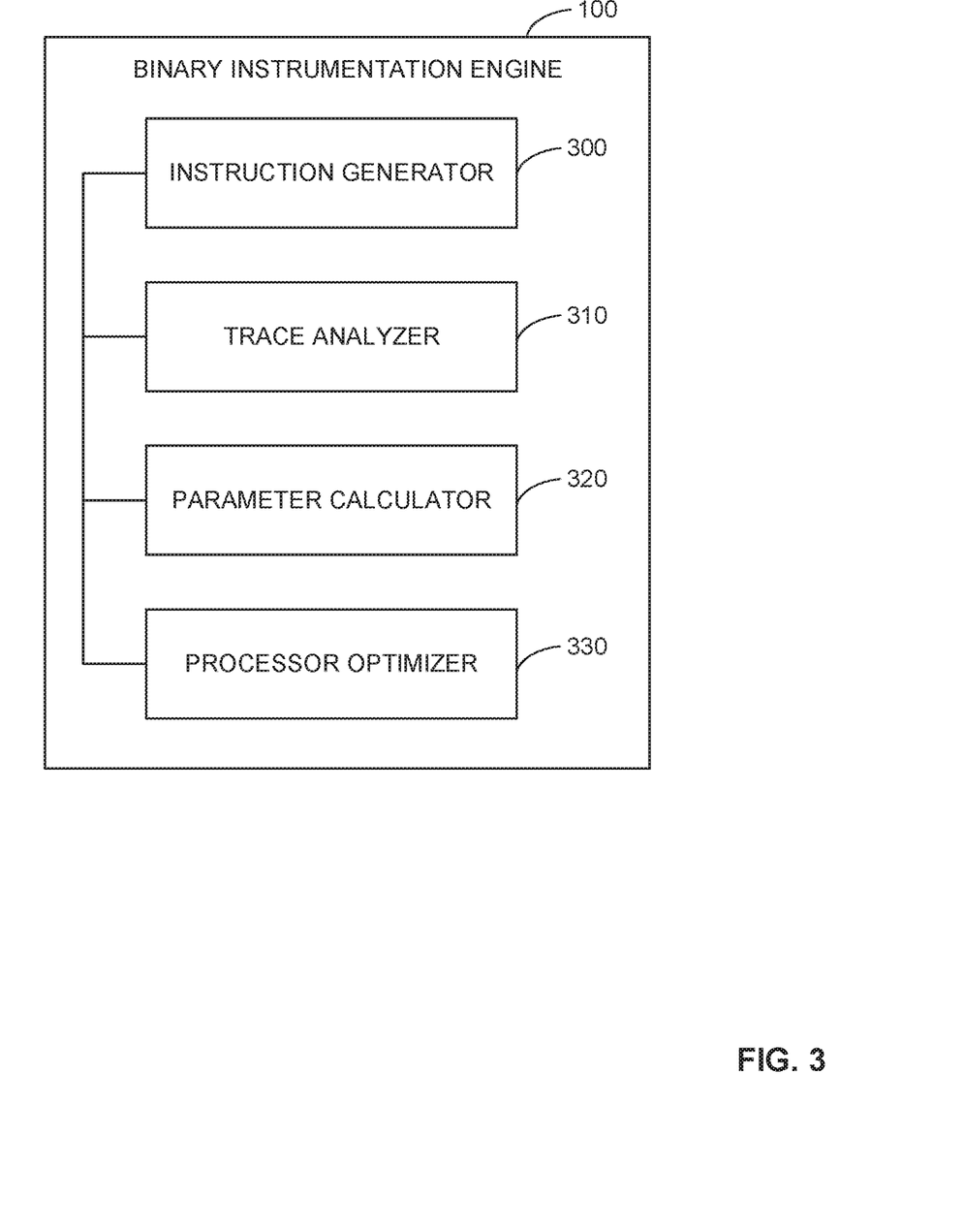
FIG. 3 is a block diagram of the example binary instrumentation engine of FIG. 1 in accordance with teachings of this disclosure.

FIG. 3 is a block diagram of the binary instrumentation engine 100 of FIG. 1 to improve operation of the GPU 108 of FIG. 1. The binary instrumentation engine 100 instruments binary shaders/kernels prior to sending them to the GPU 108. The binary instrumentation engine 100 collects traces including timestamps associated with when the instrumented code is executed by the GPU 108. The binary instrumentation engine 100 generates an occupancy map and/or one or more operating parameters based on the collected traces, where the occupancy map and/or the one or more operating parameters may be used to improve operation of the GPU 108, the CPU 112, etc. In the illustrated example of FIG. 3, the binary instrumentation engine 100 includes an example instruction generator 300, an example trace analyzer 310, an example parameter calculator 320, and an example processor optimizer 330.

In the illustrated example of FIG. 3, the binary instrumentation engine 100 includes the instruction generator 300 to instrument kernels such as the first kernel 104 of FIG. 1. For example, the instruction generator 300 may access the first kernel 104 (e.g., access the first kernel 104 from memory included in the CPU 112). The instruction generator 300 may instrument the first kernel 104 to generate the second kernel 106 of FIG. 2. For example, the instruction generator 300 may generate and insert binary code associated with the profiling instructions 102 of FIG. 1 into the first kernel 104 to generate the second kernel 106. The instruction generator 300 includes means to generate binary code (e.g., binary instructions, machine readable instructions, etc.) based on the profiling instructions 102. The instruction generator 300 includes means to insert the generated binary code into the first kernel 104 at one or more places or positions within the first kernel 104 to generate the second kernel 106.

In the illustrated example of FIG. 3, the binary instrumentation engine 100 includes the trace analyzer 310 to retrieve and/or otherwise collect the profile data 110 from the memory 120 of FIG. 1. The trace analyzer 310 includes means to extract the trace buffer 124 from the profile data 110. The trace analyzer 310 processes the trace buffer 124 by traversing the trace buffer 124 from a first position (e.g., a beginning) of the trace buffer 124 to a second position (e.g., an end) of the trace buffer 124. For example, a first one of the records 202 of FIG. 2 at the first position may have a lower hardware thread ID compared to a second one of the records 202 at the second position. In other examples, the first one of the records 202 at the first position may have lower timestamps compared to the second one of the records 202 at the second position.

In some examples, the trace analyzer 310 includes means to group the records 202 into one or more sub-traces based on the hardware thread identifiers. For example, the trace analyzer 310 may sort and/or otherwise organize the records 202 into subsets or groups having the same hardware thread ID. In such examples, the trace analyzer 310 may generate new indices for ones of the records 202 that have the same hardware thread ID. For example, for two records k and m having the same hardware thread identifier where k<m, the trace analyzer 310 may assign a new index of k' to the record k and a new index of m' to the record m. For example, if a first one of the records 202 has an index of 24 (e.g., Record 24) and a hardware thread identifier of 234 and a second one of the records 202 has an index of 37 (e.g., Record 37) and the hardware thread identifier of 234, the trace analyzer 310 may assign an index of 0 to the first one of the records 202 and an index of 1 to the second one of the records 202.

In some examples, the trace analyzer 310 traverses each of the sub-traces from ones of the records 202 having the lower indices to the ones of the records 202 having the higher indices. The trace analyzer 310 may generate a timeline (e.g., an occupancy timeline) associated with each of the records 202 in the sub-traces. For example, the trace analyzer 310 may select a first one of the records 202 in a sub-trace of interest, where the first one of the records 202 has timestamps represented by [A,B], where A refers to the first data field 204 and B refers to the second data field 206 of FIG. 2. The trace analyzer 310 may determine that a time interval spanning time A to time B is busy whereas the time outside of the time interval is idle. The trace analyzer 310 may generate (e.g., iteratively generate) timelines for each of the records 202 in one or more sub-traces of interest. The trace analyzer 310 may generate an occupancy map such as an example occupancy map 400 depicted in FIG. 4 based on the one or more timelines.

In the illustrated example of FIG. 3, the binary instrumentation engine 100 includes the parameter calculator 320 to determine one or more operating parameters associated with the GPU 108 of FIG. 1. In some examples, the parameter calculator 320 includes means to determine a busy time parameter, an idle time parameter, an occupancy time parameter, and/or a utilization parameter associated with the GPU 108. In some examples, the parameter calculator 320 determines the one or more operating parameters based on the occupancy map 400 depicted in FIG. 4. For example, the parameter calculator 320 may determine a busy time parameter for a hardware thread by determining a quantity of time that the hardware thread is busy during a time period. In other examples, the parameter calculator 320 may calculate an idle parameter for the hardware thread by determining a quantity of time that the hardware thread is idle during the time period. In yet other examples, the parameter calculator 320 may determine a utilization parameter by calculating a ratio of the busy parameter and a total quantity of time associated with a time duration of interest.

In some examples, the parameter calculator 320 determines aggregate operating parameters that are based on a quantity of hardware threads. For example, the parameter calculator 320 may calculate an aggregate utilization parameter by calculating a ratio of one or more busy hardware threads and a total quantity of hardware threads for a time duration or time period of interest.

In the illustrated example of FIG. 3, the binary instrumentation engine 100 includes the processor optimizer 330 to adjust operation of the CPU 112 and/or the GPU 108 based on the occupancy map, the one or more operating parameters, etc. In some examples, the processor optimizer 330 transmits the one or more operating parameters to the application 114 of FIG. 1. For example, the processor optimizer 330 may report and/or otherwise communicate a hardware thread utilization, an execution unit utilization, etc., associated with the GPU 108 to developers (e.g., software developers, processor designers, GPU engineers, etc.) with a performance analysis tool, a graphical user interface included in the performance analysis tool, etc. In such examples, the developers may improve their software by improving, for example, load balance of computational tasks, provisioning different data distribution among hardware threads, execution units, etc., of the GPU 108, etc.

In some examples, the processor optimizer 330 includes means to improve and/or otherwise optimize resource scheduling (e.g., hardware scheduling, memory allocation, etc.) by the CPU 112. For example, developers may develop and/or improve hardware scheduling functions or mechanisms by analyzing the one or more operating parameters associated with the GPU 108. In other examples, the processor optimizer 330 invokes hardware, software, firmware, and/or any combination of hardware, software, and/or firmware (e.g., the GPU driver 116, the CPU 112, etc.) to improve operation of the GPU 108. For example, the processor optimizer 330 may generate and transmit an instruction (e.g., a command, machine readable instructions, etc.) to the GPU driver 116, the CPU 112, etc., of FIG. 1. In response to receiving and/or otherwise executing the instruction, the GPU driver 116, the CPU 112, etc., is invoked to determine whether to adjust an operation of the GPU 108. For example, the GPU driver 116, and/or, more generally, the CPU 112 may be called to adjust scheduling of computational tasks, jobs, workloads, etc., to be executed by the GPU 108.

In some examples, the processor optimizer 330 invokes the GPU driver 116 to analyze one or more operating parameters based on an occupancy map. For example, the GPU driver 116 (or the CPU 112) may compare an operating parameter to an operating parameter threshold (e.g., a busy threshold, an idle threshold, a utilization threshold, etc.). For example, when invoked, the GPU driver 116 (or the CPU 112) may determine that a utilization of the GPU 108 is 95% corresponding to the GPU 108 being busy 95% of a measured time interval. The GPU driver 116 may compare the utilization of 95% to a utilization threshold of 80% and determine that the GPU 108 should not accept more computational tasks based on the utilization satisfying the utilization threshold (e.g., the utilization is greater than the utilization threshold). As used herein, a job or a workload may refer to a set of one or more computational tasks to be executed by one or more hardware threads.

In other examples, when invoked by the processor optimizer 330, the GPU driver 116 (or the CPU 112) may determine that a utilization of the GPU 108 is 40%. The GPU driver 116 may compare the utilization of 40% to the utilization threshold of 80% and determine that the GPU 108 has available bandwidth to execute more computational tasks. For example, the GPU driver 116 may determine that the utilization of 40% does not satisfy the utilization threshold of 80%. In response to determining that the utilization of the GPU 108 does not satisfy the utilization threshold, the GPU driver 116 may adjust or modify a schedule of resources to facilitate tasks to be executed by the GPU 108. For example, the GPU driver 116 may increase a quantity of computational tasks that the GPU 108 is currently executing and/or will be executing based on the utilization parameter.

While an example manner of implementing the binary instrumentation engine 100 of FIG. 1 is illustrated in FIG. 3, one or more of the elements, processes, and/or devices illustrated in FIG. 3 may be combined, divided, re-arranged, omitted, eliminated, and/or implemented in any other way. Further, the example instruction generator 300, the example trace analyzer 310, the example parameter calculator 320, the example processor optimizer 330, and/or, more generally, the example binary instrumentation engine 100 of FIG. 1 may be implemented by hardware, software, firmware, and/or any combination of hardware, software, and/or firmware. Thus, for example, any of the example instruction generator 300, the example trace analyzer 310, the example parameter calculator 320, the example processor optimizer 330, and/or, more generally, the example binary instrumentation engine 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)). When reading any of the apparatus or system claims of this patent to cover a purely software and/or firmware implementation, at least one of the example instruction generator 300, the example trace analyzer 310, the example parameter calculator 320, and/or the example processor optimizer 330 is/are hereby expressly defined to include a non-transitory computer readable storage device or storage disk such as a memory, a digital versatile disk (DVD), a compact disk (CD), a Blu-ray disk, etc., including the software and/or firmware. Further still, the example binary instrumentation engine 100 of FIG. 1 may include one or more elements, processes, and/or devices in addition to, or instead of, those illustrated in FIG. 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
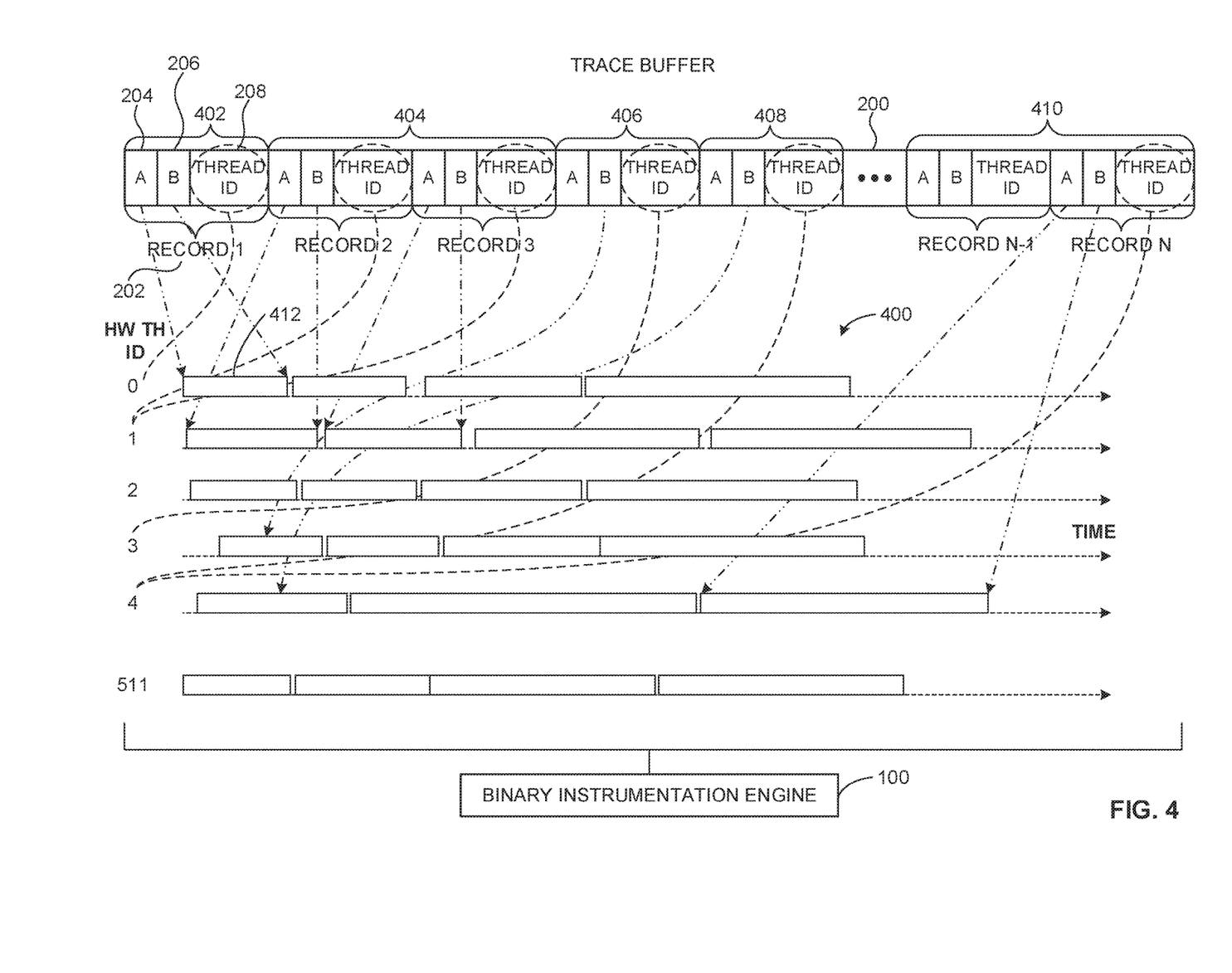
FIG. 4 depicts an example occupancy map generated in accordance with teachings of this disclosure.

FIG. 4 depicts an example occupancy map 400 generated by the binary instrumentation engine 100 of FIGS. 1 and 3. For example, the trace analyzer 310 of FIG. 3 may generate the occupancy map 400 based on one or more sub-traces included in the trace buffer 200 processed by the trace analyzer 310 of FIG. 3. In FIG. 4, the binary instrumentation engine 100 organized the records 202 into example sub-traces 402, 404, 406, 408, 410 including a first example sub-trace 402, a second example sub-trace 404, a third example sub-trace 406, a fourth example sub-trace 408, and a fifth example sub-trace 410. For example, a sub-trace may refer to a sequence of one or more records corresponding to the same hardware thread identifier.

In the illustrated example of FIG. 4, the first, third, and fourth sub-traces 402, 406, 408 each include one of the records 202. In FIG. 4, the second and fifth sub-traces 404, 410 each include two of the records 202. For example, a first one and a second one of the records 202 included in the second sub-trace 404 have the same hardware thread ID of 1. Alternatively, the first through fifth sub-traces 402, 404, 406, 408, 410 may have a different number of the records 202.

In FIG. 4, the binary instrumentation engine 100 generates the occupancy map 400 by processing the records 202 included in the sub-traces 402, 404, 406, 408, 410. For example, the trace analyzer 310 may map the one or more records 202 included in the sub-traces 402, 404, 406, 408, 410 to an example time interval (e.g., a timeline, an occupancy timeline, a time duration, etc.) 412 of the occupancy map 400. For example, the trace analyzer 310 may map the record 202 of the first sub-trace 402 to the timeline 412 of the occupancy map defined by [A,B], where A corresponds to a first timestamp of hardware thread ID 1 and B corresponds to a second timestamp of the hardware thread ID 1, where the second timestamp is after the first timestamp. The time duration spanning from the first timestamp until the second timestamp corresponds to the timeline 412. For example, the trace analyzer 310 may map timelines associated with the records 202 (e.g., the timeline 412) to generate the occupancy map 400, where the timelines represent time durations during which the corresponding hardware threads are busy. In FIG. 4, the timeline 412 has a starting point at a first position corresponding to the first timestamp and has an end point at a second position corresponding to the second timestamp. The trace analyzer 310 represents, denotes, marks, etc., the time interval between the starting point and the end point as busy (e.g., represented in FIG. 4 as a rectangle) and represents the time interval outside of the starting point and the end point as idle (e.g., represented by empty space).

In some examples, the trace analyzer 310 updates (e.g., iteratively updates, continuously updates, etc.) the occupancy map 400 based on (continuously) obtaining and (continuously) processing the trace buffer 200. In some examples, the parameter calculator 320 generates the one or more operating parameters based on the occupancy map 400. For example, the parameter calculator 320 may determine a utilization of hardware thread identifier 0 included in the GPU 108 by calculating a ratio of a busy time of the hardware thread identifier 0 with respect to a measured time period. In other examples, the parameter calculator 320 may determine an aggregate utilization of the GPU 108 by calculating a ratio of a first quantity of hardware threads that are busy and a second quantity of total hardware threads of the GPU 108 for a measured time period.

Figure 5:
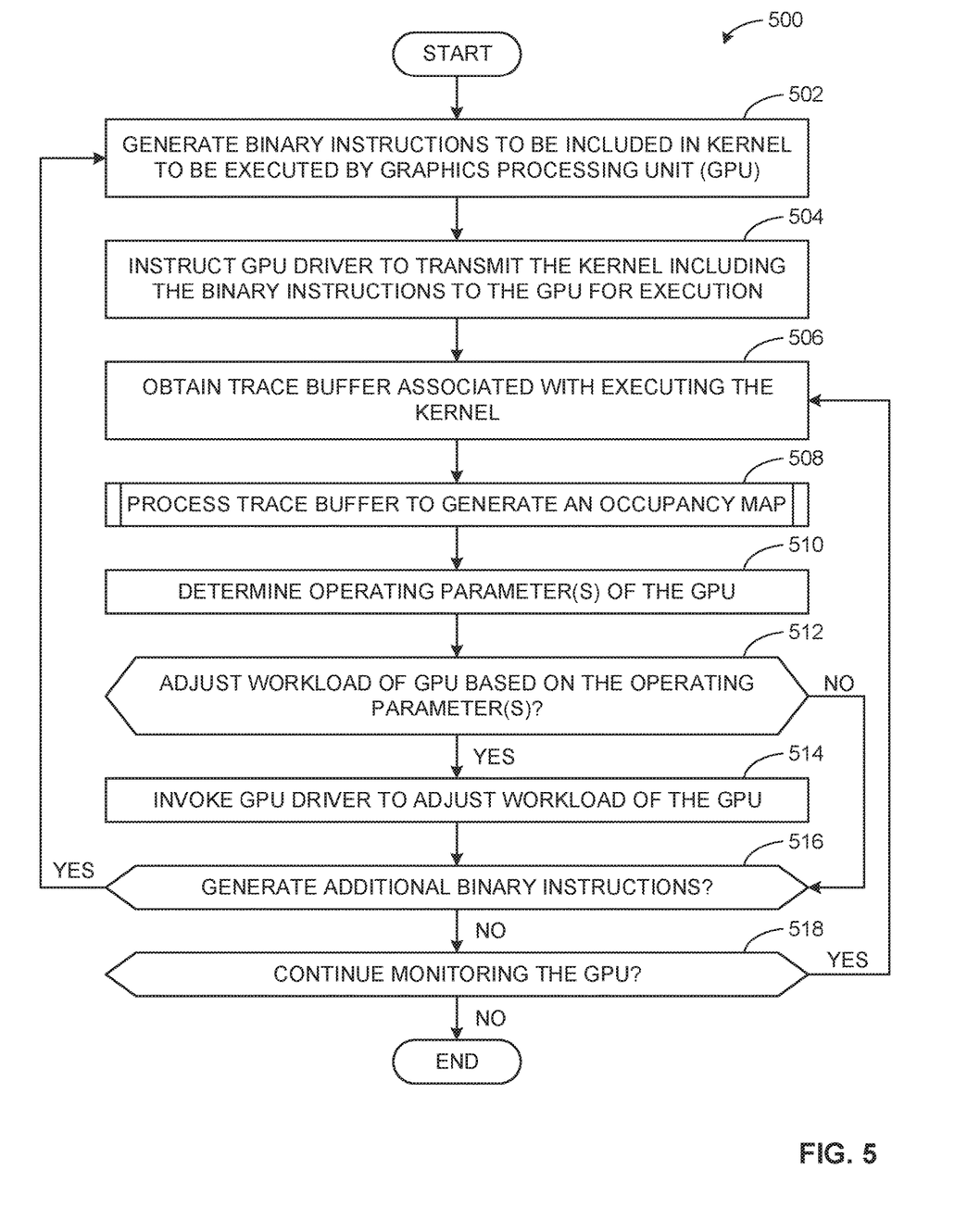
FIG. 5 is a flowchart representative of machine readable instructions which may be executed to implement the example binary instrumentation engine of FIGS. 1 and 3 to improve operation of a GPU.
Figure 6:
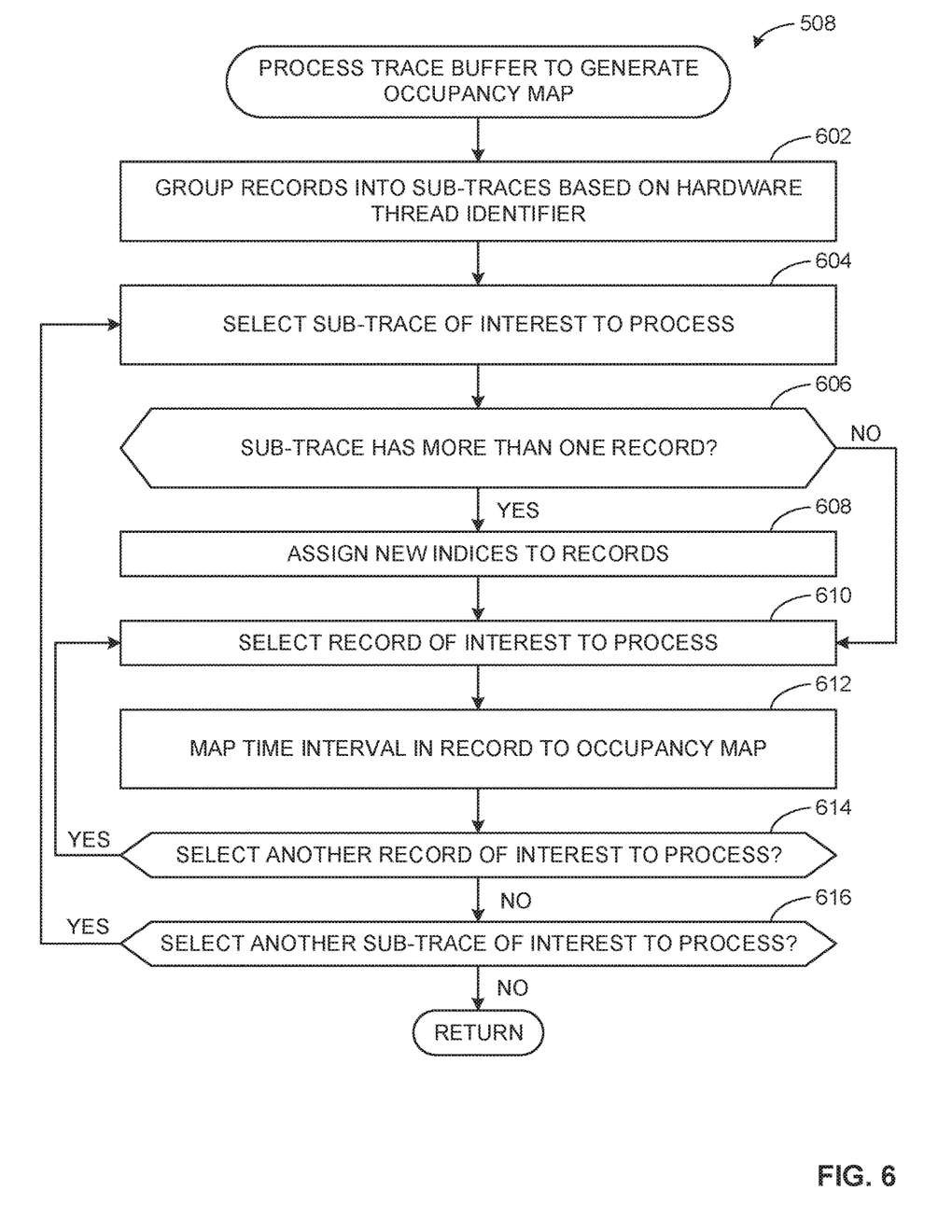
FIG. 6 is a flowchart representative of machine readable instructions which may be executed to implement the example binary instrumentation engine of FIGS. 1 and 3 to process the example trace buffer of FIG. 2 to generate the example occupancy map of FIG. 4.

Flowcharts representative of example hardware logic, machine readable instructions, hardware implemented state machines, and/or any combination thereof for implementing the binary instrumentation engine 100 of FIGS. 1 and 3 are shown in FIGS. 5-6. The machine readable instructions may be an executable program or portion of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 5-6, many other methods of implementing the example binary instrumentation engine 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 5-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

FIG. 5 is a flowchart representative of example machine readable instructions 500 which may be executed to implement the binary instrumentation engine 100 of FIGS. 1 and 3-4 to improve operation of the GPU 108 of FIG. 1. The machine readable instructions 500 begin at block 502, at which the binary instrumentation engine 100 generates binary instructions to be included a kernel to be executed by a GPU. For example, the instruction generator 300 (FIG. 3) may instrument the first kernel 104 of FIG. 1 by generating binary instructions corresponding to the profiling instructions 102 of FIG. 1 and inserting the binary instructions into the first kernel 104 to generate the second kernel 106 of FIG. 1.

At block 504, the binary instrumentation engine 100 instructs a GPU driver to transmit the kernel including the binary instructions to the GPU for execution. For example, the instruction generator 300 may transmit the second kernel 106 to the GPU driver 116 and instruct the GPU driver 116 to store the second kernel 106 in the memory 120. The GPU 108 may retrieve the second kernel 106 form the memory 120 and execute the second kernel 106.

At block 506, the binary instrumentation engine 100 obtains a trace buffer associated with executing the kernel. For example, the trace analyzer 310 may retrieve the trace buffer 124 of FIG. 1 or the trace buffer 200 of FIG. 2 from the memory 120.

At block 508, the binary instrumentation engine 100 processes the trace buffer to generate an occupancy map. For example, the trace analyzer 310 (FIG. 3) may sort and/or otherwise organize the records 202 of FIG. 2 into one or more sub-traces such as the sub-traces 402, 404, 406, 408, 410 of FIG. 4. In such examples, the trace analyzer 310 may map ones of the records 202 included in the sub-traces 402, 404, 406, 408, 410 to timelines to generate the occupancy map 400 of FIG. 4. An example process that may be used to implement block 508 is described below in connection with FIG. 6.

At block 510, the binary instrumentation engine 100 determines operating parameter(s) of the GPU. For example, the parameter calculator 320 (FIG. 3) may determine one or more operating parameters such as a busy time parameter, an idle time parameter, an occupancy time parameter, and/or a utilization parameter associated with the GPU 108 executing the second kernel 106. In some examples, the parameter calculator 320 determines the one or more operating parameters based on the information included in the occupancy map 400 of FIG. 4 such as the timeline 412.

At block 512, the CPU 112 (FIG. 1) determines whether to adjust a workload of the GPU based on the operating parameter(s). For example, the processor optimizer 330 (FIG. 3) may invoke the GPU driver 116 (FIG. 1) to compare a value of an operating parameter to an operating parameter threshold and determine whether the value satisfies the operating parameter threshold based on the comparison. For example, the GPU driver 116 may compare a utilization of 50% of the GPU 108 to a utilization threshold of 75% and determine that the utilization of 50% does not satisfy the utilization threshold of 75% based on the utilization of 50% being less than the utilization threshold of 75%. In such examples, the GPU driver 116 may determine to adjust and/or otherwise modify the workload of the GPU 108 based on the utilization of the GPU 108 satisfying the utilization threshold. For example, the GPU driver 116 may adjust the workload of the GPU 108 by increasing a quantity of computational tasks to be executed by the GPU 108.

If, at block 512, the CPU 112 determines not to adjust the workload of the GPU based on the operating parameter(s), control proceeds to block 516 to determine whether to generate additional binary instructions. If, at block 512, the CPU 112 determines to adjust the workload of the GPU based on the operating parameter(s), then, at block 514, the binary instrumentation engine 100 invokes the GPU driver to adjust the workload of the GPU. For example, the processor optimizer 330 may generate a command, an instruction, etc., to invoke the GPU driver 116 to adjust the workload of the GPU 108. For example, the GPU driver 116, and/or, more generally, the CPU 112 may determine to increase a quantity of computational tasks to be executed by the GPU 108 when invoked by the instruction generated by the processor optimizer 330.

At block 516, the binary instrumentation engine 100 determines whether to generate additional binary instructions. For example, the instruction generator 300 may determine to instrument another kernel different from the first kernel 104. If, at block 516, the binary instrumentation engine 100 determines to generate additional binary instructions, control returns to block 502 to generate binary instructions to be included in another kernel to be executed by the GPU.

If, at block 516, the binary instrumentation engine 100 determines not to generate additional binary instructions, then, at block 518, the binary instrumentation engine 100 determines whether to continue monitoring the GPU. For example, the trace analyzer 310 may determine to maintain retrieving the trace buffer 124 either asynchronously or synchronously.

If, at block 518, the binary instrumentation engine 100 determines to continue monitoring the GPU, control returns to block 506 to obtain the trace buffer associated with executing the kernel, otherwise the machine readable instructions 500 of FIG. 5 conclude.

FIG. 6 is a flowchart representative of the machine readable instructions 508 which may be executed to implement the example binary instrumentation engine 100 of FIGS. 1 and 3-4 to process the trace buffer 124 of FIG. 1 or the trace buffer 200 of FIG. 2 to generate the occupancy map 400 of FIG. 4. The machine readable instructions 508 begin at block 602, at which the binary instrumentation engine 100 groups records into sub-traces based on hardware thread identifier. For example, the trace analyzer 310 (FIG. 3) may organize the records 202 of FIG. 2 included in the trace buffer 200 based on hardware thread identifiers of the records 202 into the sub-traces 402, 404, 406, 408, 410 of FIG. 4.

At block 604, the binary instrumentation engine 100 selects a sub-trace of interest to process. For example, the trace analyzer 310 may select the second sub-trace 404 to process. At block 606, the binary instrumentation engine 100 determines whether the sub-trace has more than one record. For example, the trace analyzer 310 may determine that the second sub-trace 404 has two of the records 202, where a first one of the records 202 has a first index of 2 (Record 2) and a second one of the records 202 has a second index of 3 (Record 3).

If, at block 606, the binary instrumentation engine 100 determines that the sub-trace does not have more than one record, control proceeds to block 610 to select a record of interest to process. If, at block 606, the binary instrumentation engine 100 determines that the sub-trace has more than one record, then at block 608, the binary instrumentation engine 100 assigns new indices to the records. For example, the trace analyzer 310 may assign an index of 1 to the first one of the records 202 included in the second sub-trace 404 and assign an index of 2 to the second one of the records 202 included in the second sub-trace 404.

At block 610, the binary instrumentation engine 100 selects a record of interest to process. For example, the trace analyzer 310 may select the first one of the records 202 included in the second sub-trace 404 to process. At block 612, the binary instrumentation engine 100 maps a time interval in the record to an occupancy map. For example, the trace analyzer 310 may map the time interval represented by [A,B] in the first one of the records 202 included in the second sub-trace 404 to the occupancy map 400. The trace analyzer 310 may designate the time interval from [A,B] as busy in the occupancy map 400 and designate the time interval outside of [A,B] as idle.

At block 614, the binary instrumentation engine 100 determines whether to select another record of interest to process. For example, the trace analyzer 310 may determine to select the second one of the records 202 included in the second sub-trace 404 to process.

If, at block 614, the binary instrumentation engine 100 determines to select another record of interest to process, control returns to block 610 to select another record of interest to process. If, at block 614, the binary instrumentation engine 100 determines not to select another record of interest to process, then, at block 616, the binary instrumentation engine 100 determines whether to select another sub-trace of interest to process. For example, the trace analyzer 310 may determine to select the third sub-trace 406 of the trace buffer 124 to process.

If, at block 616, the binary instrumentation engine 100 determines to select another sub-trace of interest to process, control returns to block 604 to select another sub-trace of interest to process. If, at block 616, the binary instrumentation engine 100 determines not to select another sub-trace of interest to process, control returns to block 510 of the machine readable instructions 500 of FIG. 5 to determine operating parameter(s) of the GPU.

Figure 7:
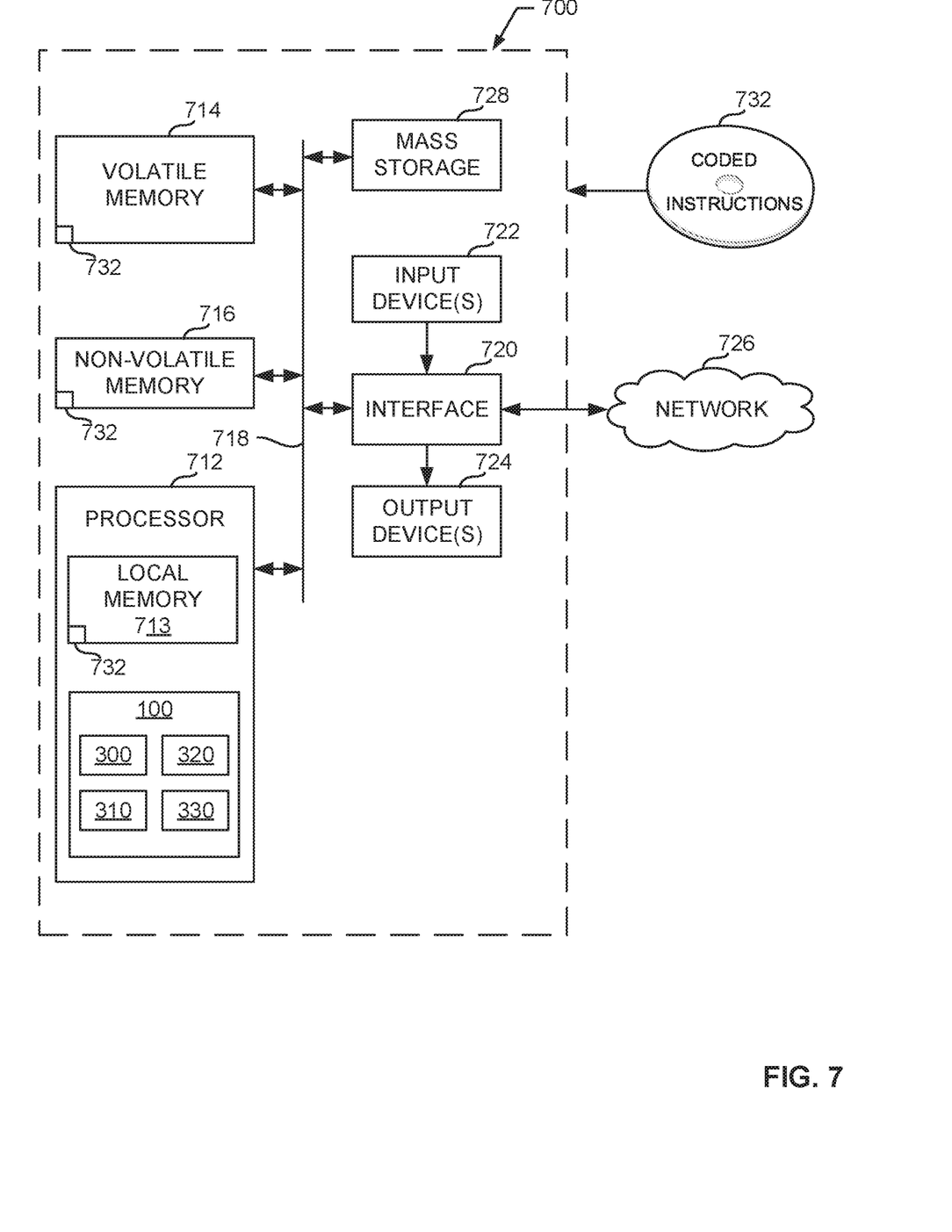
FIG. 7 is a block diagram of an example processing platform structured to execute the instructions of FIGS. 5-6 to implement the example binary instrumentation engine of FIGS. 1 and 3.

FIG. 7 is a block diagram of an example processor platform 700 structured to execute the instructions of FIGS. 5-6 to implement the binary instrumentation engine of FIGS. 1 and 3-4. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 712 implements the example instruction generator 300, the example trace analyzer 310, the example parameter calculator 320, and the example processor optimizer 330 of FIG. 3.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer, and/or speaker. The interface circuit 720 of the illustrated example, thus, typically includes a graphics driver card, a graphics driver chip, and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices

728 include floppy disk drives, hard drive disks, compact disk drives, Blu-ray disk drives, redundant array of independent disks (RAID) systems, and digital versatile disk (DVD) drives.

The machine executable instructions 732 of FIGS. 5-6 be stored in the mass storage device 728, in the volatile memory 714, in the non-volatile memory 716, and/or on a removable non-transitory computer readable storage medium such as a CD or DVD.

From the foregoing, it will be appreciated that example methods, apparatus, and articles of manufacture have been disclosed that improve operation of a processor, a graphics processing unit, etc. The disclosed methods, apparatus, and articles of manufacture improve the efficiency of using a computing device by adjusting a resource schedule based on available bandwidth of resources. By increasing a quantity of computational tasks to be executed by a GPU based on determining one or more operating parameters disclosed herein, the GPU may execute more computational tasks compared to prior systems. By determining the one or more parameters disclosed herein, developers can generate kernels that can be executed quickly and more efficiently by GPUs compared to prior systems. The disclosed methods, apparatus, and articles of manufacture are accordingly directed to one or more improvement(s) in the functioning of a computer.

The following pertain to further examples disclosed herein.

Example 1 includes an apparatus to improve operation of a graphics processing unit (GPU), the apparatus comprising an instruction generator to insert profiling instructions into a GPU kernel to generate an instrumented GPU kernel, the instrumented GPU kernel is to be executed by a GPU, a trace analyzer to generate an occupancy map associated with the GPU executing the instrumented GPU kernel, a parameter calculator to determine one or more operating parameters of the GPU based on the occupancy map, and a processor optimizer to invoke hardware adjust a workload of the GPU based on the one or more operating parameters.

Example 2 includes the apparatus of example 1, wherein the instruction generator is to insert the profiling instructions by inserting a first subset of the profiling instructions at a first address of the GPU kernel and inserting a second subset of the profiling instructions at a second address of the GPU kernel, the first address different from the second address.

Example 3 includes the apparatus of example 1, wherein the instrumented GPU kernel is to cause the GPU to generate a trace buffer including timestamps and hardware thread identifiers, the trace buffer including one or more records, the one or more records each including a first data field corresponding to a first timestamp included in the timestamps, a second data field corresponding to a second timestamp included in the timestamps, and a third data field corresponding to one of the hardware thread identifiers.

Example 4 includes the apparatus of example 1, wherein the trace analyzer is to generate the occupancy map by grouping one or more records of a trace buffer generated by the GPU into one or more sub-traces based on hardware thread identifiers included in the trace buffer, the one or more records having first indices, assigning second indices to the one or more records in the one or more sub-traces when the one or more sub-traces have more than one of the one or more records, the second indices different from the first indices, and mapping timelines associated with the one or more records to the occupancy map.

Example 5 includes the apparatus of example 4, wherein the trace analyzer is to map the timelines to the occupancy map by representing first time durations of the occupancy map corresponding to the timelines as busy and representing second time durations of the occupancy map as idle, the second time durations corresponding to time periods not included in the timelines.

Example 6 includes the apparatus of example 1, wherein the one or more operating parameters include at least one of a busy time parameter, an idle time parameter, an occupancy time parameter, or a utilization parameter.

Example 7 includes the apparatus of example 1, wherein the hardware is to adjust the workload of the GPU by comparing a first one of the one or more operating parameters to a threshold, determining whether to increase a quantity of computational tasks to be executed by the GPU based on the comparison, and increasing the quantity of computational tasks when the first one of the one or more parameters satisfies the threshold.

Example 8 includes a non-transitory computer readable medium comprising instructions which, when executed, cause a machine to at least insert profiling instructions into a GPU kernel to generate an instrumented GPU kernel, the instrumented GPU kernel is to be executed by a GPU, generate an occupancy map associated with the GPU executing the instrumented GPU kernel, determine one or more operating parameters of the GPU based on the occupancy map, and adjust a workload of the GPU based on the one or more operating parameters.

Example 9 includes the non-transitory computer readable medium of example 8, further including instructions which, when executed, cause the machine to at least insert a first subset of the profiling instructions at a first address of the GPU kernel and insert a second subset of the profiling instructions at a second address of the GPU kernel, the first address different from the second address.

Example 10 includes the non-transitory computer readable medium of example 8, wherein the instrumented GPU kernel is to cause the GPU to generate a trace buffer including timestamps and hardware thread identifiers, the trace buffer including one or more records, the one or more records each including a first data field corresponding to a first timestamp included in the timestamps, a second data field corresponding to a second timestamp included in the timestamps, and a third data field corresponding to one of the hardware thread identifiers.

Example 11 includes the non-transitory computer readable medium of example 8, further including instructions which, when executed, cause the machine to at least group one or more records of a trace buffer generated by the GPU into one or more sub-traces based on hardware thread identifiers included in the trace buffer, the one or more records having first indices, assign second indices to the one or more records in the one or more sub-traces when the one or more sub-traces have more than one of the one or more records, the second indices different from the first indices, and map timelines associated with the one or more records to the occupancy map.

Example 12 includes the non-transitory computer readable medium of example 11, further including instructions which, when executed, cause the machine to at least represent first time durations of the occupancy map corresponding to the timelines as busy and represent second time durations of the occupancy map as idle, the second time durations corresponding to time periods not included in the timelines.

Example 13 includes the non-transitory computer readable medium of example 8, wherein the one or more operating parameters include at least one of a busy time parameter, an idle time parameter, an occupancy time parameter, or a utilization parameter.

Example 14 includes the non-transitory computer readable medium of example 8, further including instructions which, when executed, cause the machine to at least compare a first one of the one or more operating parameters to a threshold, determine whether to increase a quantity of computational tasks to be executed by the GPU based on the comparison, and increase the quantity of computational tasks when the first one of the one or more parameters satisfies the threshold.

Example 15 includes an apparatus to improve operation of a graphics processing unit (GPU), the apparatus comprising means for inserting profiling instructions into a GPU kernel to generate an instrumented GPU kernel, the instrumented GPU kernel is to be executed by a GPU, means for generating an occupancy map associated with the GPU executing the instrumented GPU kernel, means for determining one or more operating parameters of the GPU based on the occupancy map, and means for adjusting a workload of the GPU based on the one or more operating parameters.

Example 16 includes the apparatus of example 15, wherein the means for inserting the profiling instructions is to insert a first subset of the profiling instructions at a first address of the GPU kernel and insert a second subset of the profiling instructions at a second address of the GPU kernel, the first address different from the second address.

Example 17 includes the apparatus of example 15, wherein the instrumented GPU kernel is to cause the GPU to generate a trace buffer including timestamps and hardware thread identifiers, the trace buffer including one or more records, the one or more records each including a first data field corresponding to a first timestamp included in the timestamps, a second data field corresponding to a second timestamp included in the timestamps, and a third data field corresponding to one of the hardware thread identifiers.

Example 18 includes the apparatus of example 15, wherein the means for generating the occupancy map is to group one or more records of a trace buffer generated by the GPU into one or more sub-traces based on hardware thread identifiers included in the trace buffer, the one or more records having first indices, assign second indices to the one or more records in the one or more sub-traces when the one or more sub-traces have more than one of the one or more records, the second indices different from the first indices, and map timelines associated with the one or more records to the occupancy map.

Example 19 includes the apparatus of example 18, wherein the means for generating the occupancy map is to map the timelines to the occupancy map by representing first time durations of the occupancy map corresponding to the timelines as busy and representing second time durations of the occupancy map as idle, the second time durations corresponding to time periods not included in the timelines.

Example 20 includes the apparatus of example 15, wherein the one or more operating parameters include at least one of a busy time parameter, an idle time parameter, an occupancy time parameter, or a utilization parameter.

Example 21 includes the apparatus of example 15, wherein the means for adjusting the workload of the GPU is to compare a first one of the one or more operating parameters to a threshold, determine whether to increase a quantity of computational tasks to be executed by the GPU based on the comparison, and increase the quantity of computational tasks when the first one of the one or more parameters satisfies the threshold.

Example 22 includes a method to improve operation of a graphic processing unit (GPU), the method comprising inserting profiling instructions into a GPU kernel to generate an instrumented GPU kernel, the instrumented GPU kernel is to be executed by a GPU, generating an occupancy map associated with the GPU executing the instrumented GPU kernel, determining one or more operating parameters of the GPU based on the occupancy map, and adjusting a workload of the GPU based on the one or more operating parameters.

Example 23 includes the method of example 22, wherein the instrumented GPU kernel is to cause the GPU to generate a trace buffer including timestamps and hardware thread identifiers, the trace buffer including one or more records, the one or more records each including a first data field corresponding to a first timestamp included in the timestamps, a second data field corresponding to a second timestamp included in the timestamps, and a third data field corresponding to one of the hardware thread identifiers.

Example 24 includes the method of example 22, further including grouping one or more records of a trace buffer generated by the GPU into one or more sub-traces based on hardware thread identifiers included in the trace buffer, the one or more records having first indices, assigning second indices to the one or more records in the one or more sub-traces when the one or more sub-traces have more than one of the one or more records, the second indices different from the first indices, and mapping timelines associated with the one or more records to the occupancy map.

Example 25 includes the method of example 22, further including comparing a first one of the one or more operating parameters to a threshold, determining whether to increase a quantity of computational tasks to be executed by the GPU based on the comparison, and increasing the quantity of computational tasks when the first one of the one or more parameters satisfies the threshold.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to improve operation of a graphics processing unit (GPU), the apparatus comprising:
   an instruction generator to insert profiling instructions into a GPU kernel to generate an instrumented GPU kernel, the instrumented GPU kernel to be executed by a GPU;
   a trace analyzer to:
      group one or more records of a trace buffer generated by the GPU into one or more sub-traces based on hardware thread identifiers included in the trace buffer, the one or more records having first indices;
      assign second indices to the one or more records in the one or more sub-traces when the one or more sub-traces have more than one of the one or more records, the second indices different from the first indices; and
      map timelines associated with the one or more records to an occupancy map, the occupancy map associated with the GPU executing the instrumented GPU kernel;
   a parameter calculator to determine one or more operating parameters of the GPU based on the occupancy map; and a processor optimizer to invoke hardware to adjust a workload of the GPU based on the one or more operating parameters.

2. The apparatus of claim 1, wherein the instruction generator is to insert the profiling instructions by inserting a first subset of the profiling instructions at a first address of the GPU kernel and inserting a second subset of the profiling instructions at a second address of the GPU kernel, the first address different from the second address.

3. The apparatus of claim 1, wherein the instrumented GPU kernel is to cause the GPU to generate the trace buffer, the trace buffer including timestamps, hardware thread identifiers, and the one or more records, a first one of the one or more records including a first data field corresponding to a first timestamp included in the timestamps, a second data field corresponding to a second timestamp included in the timestamps, and a third data field corresponding to one of the hardware thread identifiers.

4. The apparatus of claim 1, wherein the trace analyzer is to map the timelines to the occupancy map by representing first time durations of the occupancy map corresponding to the timelines as busy and representing second time durations of the occupancy map as idle, the second time durations corresponding to time periods not included in the timelines.

5. The apparatus of claim 1, wherein the one or more operating parameters include at least one of a busy time parameter, an idle time parameter, an occupancy time parameter, or a utilization parameter.

6. The apparatus of claim 1, wherein the hardware is to adjust the workload of the GPU by:
comparing a first one of the one or more operating parameters to a threshold;
determining whether to increase a quantity of computational tasks to be executed by the GPU based on the comparison; and
increasing the quantity of computational tasks when the first one of the one or more operating parameters satisfies the threshold.

7. A non-transitory computer readable medium comprising instructions which, when executed, cause a machine to at least:
insert profiling instructions into a GPU kernel to generate an instrumented GPU kernel, the instrumented GPU kernel to be executed by a GPU;
group one or more records of a trace buffer generated by the GPU into one or more sub-traces based on hardware thread identifiers included in the trace buffer, the one or more records having first indices;
assign second indices to the one or more records in the one or more sub-traces when the one or more sub-traces have more than one of the one or more records, the second indices different from the first indices;
map timelines associated with the one or more records to an occupancy map, the occupancy map associated with the GPU executing the instrumented GPU kernel;
determine one or more operating parameters of the GPU based on the occupancy map; and
adjust a workload of the GPU based on the one or more operating parameters.

8. The non-transitory computer readable medium of claim 7, wherein the instructions, when executed, cause the machine to at least insert a first subset of the profiling instructions at a first address of the GPU kernel and insert a second subset of the profiling instructions at a second address of the GPU kernel, the first address different from the second address.

9. The non-transitory computer readable medium of claim 7, wherein the instrumented GPU kernel is to cause the GPU to generate the trace buffer, the trace buffer including timestamps, hardware thread identifiers, and the one or more records, a first one of the one or more records including a first data field corresponding to a first timestamp included in the timestamps, a second data field corresponding to a second timestamp included in the timestamps, and a third data field corresponding to one of the hardware thread identifiers.

10. The non-transitory computer readable medium of claim 7, wherein the instructions, when executed, cause the machine to at least represent first time durations of the occupancy map corresponding to the timelines as busy and represent second time durations of the occupancy map as idle, the second time durations corresponding to time periods not included in the timelines.

11. The non-transitory computer readable medium of claim 7, wherein the one or more operating parameters include at least one of a busy time parameter, an idle time parameter, an occupancy time parameter, or a utilization parameter.

12. The non-transitory computer readable medium of claim 7, wherein the instructions, when executed, cause the machine to at least:
compare a first one of the one or more operating parameters to a threshold;
determine whether to increase a quantity of computational tasks to be executed by the GPU based on the comparison; and
increase the quantity of computational tasks when the first one of the one or more operating parameters satisfies the threshold.

13. An apparatus to improve operation of a graphics processing unit (GPU), the apparatus comprising:
means for inserting profiling instructions into a GPU kernel to generate an instrumented GPU kernel, the instrumented GPU kernel to be executed by a GPU;
means for generating an occupancy map associated with the GPU, the means for generating to:
group one or more records of a trace buffer generated by the GPU into one or more sub-traces based on hardware thread identifiers included in the trace buffer, the one or more records having first indices;
assign second indices to the one or more records in the one or more sub-traces when the one or more sub-traces have more than one of the one or more records, the second indices different from the first indices; and
map timelines associated with the one or more records to the occupancy map;
means for determining one or more operating parameters of the GPU based on the occupancy map; and
means for adjusting a workload of the GPU based on the one or more operating parameters.

14. The apparatus of claim 13, wherein the means for inserting the profiling instructions is to insert a first subset of the profiling instructions at a first address of the GPU kernel and insert a second subset of the profiling instructions at a second address of the GPU kernel, the first address different from the second address.

15. The apparatus of claim 13, wherein the instrumented GPU kernel is to cause the GPU to generate the trace buffer, the trace buffer including timestamps, hardware thread identifiers, and the one or more records, a first one of the one or more records including a first data field corresponding to a first timestamp included in the timestamps, a second data field corresponding to a second timestamp included in the timestamps, and a third data field corresponding to one of the hardware thread identifiers.

16. The apparatus of claim 13, wherein the means for generating the occupancy map is to map the timelines to the occupancy map by representing first time durations of the occupancy map corresponding to the timelines as busy and representing second time durations of the occupancy map as idle, the second time durations corresponding to time periods not included in the timelines.

17. The apparatus of claim 13, wherein the one or more operating parameters include at least one of a busy time parameter, an idle time parameter, an occupancy time parameter, or a utilization parameter.

18. The apparatus of claim 13, wherein the means for adjusting the workload of the GPU is to:
compare a first one of the one or more operating parameters to a threshold;
determine whether to increase a quantity of computational tasks to be executed by the GPU based on the comparison; and
increase the quantity of computational tasks when the first one of the one or more operating parameters satisfies the threshold.

19. A method to improve operation of a graphic processing unit (GPU), the method comprising:
inserting profiling instructions into a GPU kernel to generate an instrumented GPU kernel, the instrumented GPU kernel to be executed by a GPU;
grouping one or more records of a trace buffer generated by the GPU into one or more sub-traces based on hardware thread identifiers included in the trace buffer, the one or more records having first indices;
assigning second indices to the one or more records in the one or more sub-traces when the one or more sub-traces have more than one of the one or more records, the second indices different from the first indices;
mapping timelines associated with the one or more records to an occupancy map, the occupancy map associated with the GPU executing the instrumented GPU kernel;
determining one or more operating parameters of the GPU based on the occupancy map; and
adjusting a workload of the GPU based on the one or more operating parameters.

20. The method of claim 19, wherein the instrumented GPU kernel is to cause the GPU to generate a trace buffer, the trace buffer including timestamps, hardware thread identifiers, and one or more records, a first one of the one or more records including a first data field corresponding to a first timestamp included in the timestamps, a second data field corresponding to a second timestamp included in the timestamps, and a third data field corresponding to one of the hardware thread identifiers.

21. The method of claim 19, further including:
comparing a first one of the one or more operating parameters to a threshold;
determining whether to increase a quantity of computational tasks to be executed by the GPU based on the comparison; and
increasing the quantity of computational tasks when the first one of the one or more operating parameters satisfies the threshold.

22. An apparatus to improve operation of a graphics processing unit (GPU), the apparatus comprising:
processor circuitry;
memory including instructions that, when executed, cause the processor circuitry to:
insert profiling instructions into a GPU kernel to generate an instrumented GPU kernel, the instrumented GPU kernel to be executed by a GPU;
group one or more records of a trace buffer generated by the GPU into one or more sub-traces based on hardware thread identifiers included in the trace buffer, the one or more records having first indices;
assign second indices to the one or more records in the one or more sub- traces when the one or more sub-traces have more than one of the one or more records, the second indices different from the first indices;
map timelines associated with the one or more records to an occupancy map, the occupancy map associated with the GPU executing instrumented GPU kernel;
determine one or more operating parameters of the GPU based on the occupancy map; and
adjust a workload of the GPU based on the one or more operating parameters.

23. The apparatus of claim 22, wherein the processor circuitry is to insert the profiling instructions by inserting a first subset of the profiling instructions at a first address of the GPU kernel and inserting a second subset of the profiling instructions at a second address of the GPU kernel, the first address different from the second address.

24. The apparatus of claim 22, wherein the instrumented GPU kernel is to cause the GPU to generate the trace buffer, the trace buffer including timestamps, hardware thread identifiers, and one or more records, a first one of the one or more records including a first data field corresponding to a first timestamp included in the timestamps, a second data field corresponding to a second timestamp included in the timestamps, and a third data field corresponding to one of the hardware thread identifiers.

25. The apparatus of claim 22, wherein the processor circuitry is to map the timelines to the occupancy map by representing first time durations of the occupancy map corresponding to the timelines as busy and representing second time durations of the occupancy map as idle, the second time durations corresponding to time periods not included in the timelines.

26. The apparatus of claim 22, wherein the one or more operating parameters include at least one of a busy time parameter, an idle time parameter, an occupancy time parameter, or a utilization parameter.

27. The apparatus of claim 22, wherein the processor circuitry is to adjust the workload of the GPU by:
comparing a first one of the one or more operating parameters to a threshold;
determining whether to increase a quantity of computational tasks to be executed by the GPU based on the comparison; and
increasing the quantity of computational tasks when the first one of the one or more operating parameters satisfies the threshold.

* * * * *